Feb. 12, 1952  A. KURTZ  2,585,795
ANTISKID DEVICE
Filed July 28, 1949
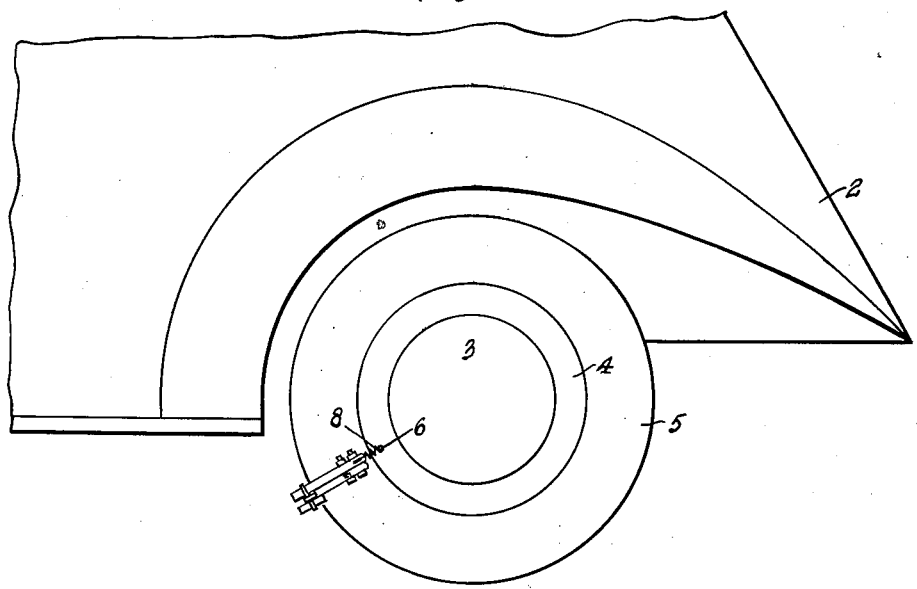
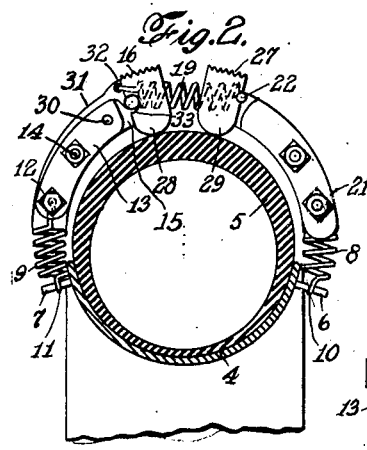
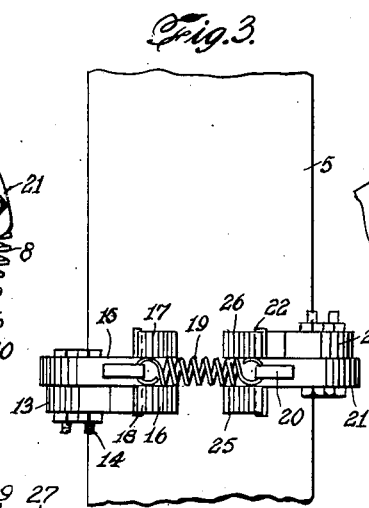
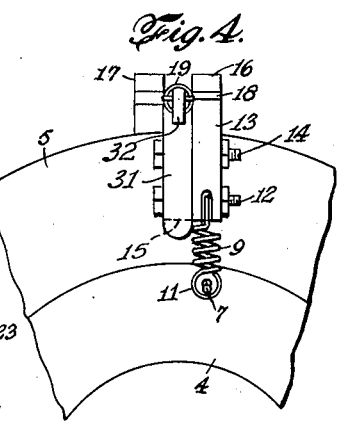
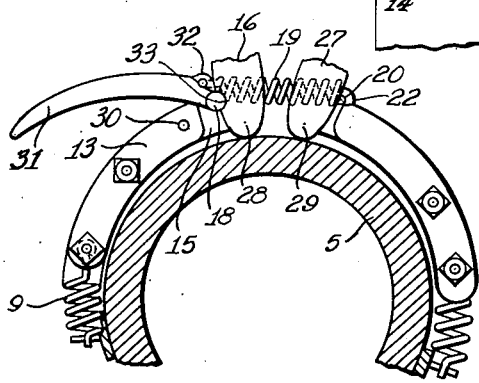
INVENTOR.
ANDREW KURTZ
BY
ATTORNEY.

Patented Feb. 12, 1952

2,585,795

UNITED STATES PATENT OFFICE 2,585,795

ANTISKID DEVICE

Andrew Kurtz, Allentown, Pa.

Application July 28, 1949, Serial No. 107,229

3 Claims. (Cl. 152—218)

This invention relates to means for increasing the traction of the wheels of automotive devices. More particularly the invention pertains to anti-skid devices for use on the wheels of automobiles, motor trucks and the like. The invention relates further to means of this order which may be easily and quickly attached to a wheel and which may be readily removed therefrom without the employment of tools.

It is an object of the invention to provide a simple, effective and inexpensive anti-skid device which is adjustable for use on wheels equipped with tires of various diameters. It is also an object to provide an anti-skid device which may be quickly placed upon a wheel and locked snugly upon the tire without the use of tools.

Further objects and the advantages of the invention will be brought out as this specification is read in conjunction with the drawings which form a part thereof and in which:

Figure 1 is a side elevation of a part of an automotive device showing a wheel to which is attached an anti-skid unit constructed according to one embodiment of my invention.

Figure 2 is a cross section of a tire and rim showing my anti-skid locked thereon.

Figure 3 is a top view of my device shown in position on a wheel.

Figure 4 is a side view of a portion of a wheel and showing my device secured thereto.

Figure 5 is a fragmentary elevation similar to Figure 2, showing a lever in raised position for releasing the clamping spring tension of the device.

In the drawing 2 is a portion of an automotive device, a driving wheel 3 of which is provided with a rim 4 upon which is carried a suitable resilient tire 5. Positioned on the rim 4 and carried thereby are pins 6 and 7. These pins serve to retain the anti-skid device on the wheel, the springs 8 and 9 carried thereby being provided with eyes 10 and 11 for detachable engagement with said pins. Spring 9 is secured at 12 to the leaf member 13 which in turn is secured, by means of the bolt 14 to the body element 15. This body element 15 is provided with two, spaced apart traction heads 16 and 17. Retained between the said heads, by means of eye 32 of a release lever 31 is a spring 19 and the opposite end of this spring 19 is connected to the eye 20 on the opposite leaf member 21, with the result that normally, both leaf members are retained adjacent to the wall of tire 5 while the spring 19 is under tension. The operating lever 31 is pivoted upon transverse pin 18 riding in transverse groove 33 in leaf member 13 so that it may be swung outward as best seen in Figure 5, releasing spring 19 by moving eye 32 and thus slacking tension of this spring. When the lever 31 is swung inward again against leaf 13, the spring is, of course again tightened and the same tends to hold the lever in its tensed closed position as shown in Figures 2, 3 and 4. The body member 23 is provided with two, spaced apart traction heads 25 and 26 between which spring 19 passes. All of the said friction heads or traction heads 16, 17, 25 and 26, preferably have their upper surfaces toothed, as shown at 27 to increase their traction effect and, at their inner portions, as indicated at 28 and 29, these heads are suitably formed to make firm frictional contact with the tire tread. From the above it will be seen that all that is necessary, when it is desired to use the invention is to open the lever element 31, by raising same angularly upward about the pivot pin 18 in groove 33, slip the device over the tire and connect the springs 8 and 9 on to the pins 6 and 7, and then press the lever element 31 back to its normal position adjacent to or against leaf 13, whereby the spring 19 is placed under tension to tightly clamp the device in place upon the wheel. The leaf member 13 may be provided with several, spaced holes 30, for the bolts 12 and 14, so that smaller or larger tires may be accommodated.

Accordingly, it will be seen that I provide a simple, inexpensive anti-skid device which may be easily and quickly put in position on a wheel and manually locked, under spring tension, so as to stay firmly in place during the operation of the car, the said device being easily and quickly removable by a simple manually operable lever action.

Having illustrated and described one embodyment of my invention it will be understood that structural modifications and changes may be made without departing from the spirit of the invention as set forth in the following claims.

I claim:

1. In an anti-skid device, the combination of a motor car wheel having a resilient tire, a rim on which the tire is mounted, means on said rim for receiving and retaining an anti-skid unit, an anti-skid unit having a set of traction heads coupled by a spring, means for attaching the said unit to said receiving and retaining means and a manually operable lever on said unit for placing said spring under tension for removably locking the anti-skid unit on said wheel.

2. In an anti-skid device, the combination of a motor car wheel comprising a rim upon which is carried a resilient tire, an anti-skid unit having a pair of traction heads coupled by a spring, spring means for attaching the unit to the wheel and a manually operable lever for placing the said springs under tension for causing the unit to hug the resilient tire.

3. In an anti-skid device for motor car wheels, the combination of a wheel having a rim and a resilient tire mounted thereon, an anti-skid unit including two elements coupled by a spring, means on said rim for holding the unit in place on said wheel and means on said unit for placing the spring under tension for retaining the unit snugly against the face of the resilient tire.

ANDREW KURTZ.

REFERENCES CITED

The following references are of record in the file of this patent:

UNITED STATES PATENTS

| Number | Name | Date |
|---|---|---|
| 938,990 | Eastwood | Nov. 2, 1909 |
| 1,405,672 | Davis | Feb. 7, 1922 |
| 1,941,935 | Erickson | Jan. 2, 1934 |
| 2,464,564 | Dunner | Mar. 15, 1949 |